United States Patent
Sugino et al.

(10) Patent No.: US 7,370,535 B2
(45) Date of Patent: May 13, 2008

(54) STATE MEASURING APPARATUS AND OPERATION CONTROL METHOD FOR THE SAME

(75) Inventors: Masayoshi Sugino, Anjo (JP); Noriyasu Amano, Gamagori (JP); Shinsuke Takakura, Kariya (JP)

(73) Assignees: Denso Corporation, Kariya, Aichi-pref. (JP); Nippon Soken, Inc., Nishio, Aichi-pref. (JP)

(*) Notice: Subject to any disclaimer, the term of this patent is extended or adjusted under 35 U.S.C. 154(b) by 0 days.

(21) Appl. No.: 11/653,851

(22) Filed: Jan. 17, 2007

(65) Prior Publication Data
US 2007/0220983 A1 Sep. 27, 2007

(30) Foreign Application Priority Data
Mar. 23, 2006 (JP) ............................ 2006-081457

(51) Int. Cl.
*G01L 11/00* (2006.01)
(52) U.S. Cl. ......................... 73/700; 125/520
(58) Field of Classification Search .................. 73/700, 73/733, 717, 745; 125/529
See application file for complete search history.

(56) References Cited

U.S. PATENT DOCUMENTS

| 5,390,645 | A | * | 2/1995 | Cook et al. ................. 123/520 |
|---|---|---|---|---|
| 5,447,141 | A | * | 9/1995 | Kitamoto et al. ........... 123/520 |
| 6,016,792 | A | * | 1/2000 | Kawano et al. ............. 123/520 |
| 6,223,593 | B1 | * | 5/2001 | Kubisiak et al. ......... 73/204.15 |
| 6,385,273 | B1 | * | 5/2002 | Hsu et al. ..................... 377/19 |
| 6,971,375 | B2 | | 12/2005 | Amano et al. |
| 2005/0184876 | A1 | | 8/2005 | Tokudome |
| 2006/0042605 | A1 | | 3/2006 | Amano et al. |
| 2007/0157908 | A1 | * | 7/2007 | Kano et al. ................. 123/520 |

FOREIGN PATENT DOCUMENTS

| JP | 9-43078 | 2/1997 |
|---|---|---|
| JP | 9-147283 | 6/1997 |
| JP | 2000-55954 | 2/2000 |
| JP | 2003-273673 | 9/2003 |

OTHER PUBLICATIONS

U.S. Appl. No. 11/485,381, filed Jul. 2006, Sugino et al.

* cited by examiner

*Primary Examiner*—Andre J. Allen
(74) *Attorney, Agent, or Firm*—Nixon & Vanderhye P.C.

(57) ABSTRACT

An oscillation-type state measuring apparatus has an oscillation-type sensor, a reference oscillation signal generating circuit for producing reference oscillation signals, a beat signal generating circuit for generating beat signals having a beat frequency by synthesizing the sensor oscillation signals and the reference oscillation signals, a counter for measuring a period of the beat signals, and a physical quantity calculation circuit for calculating a physical quantity from the period of the beat signals and from the period of the reference oscillation signals. The reference oscillation signal generating circuit varies the frequency of the reference oscillation signals, and the physical quantity calculation circuit calculates the physical quantity based on the varied period of the reference oscillation signals.

20 Claims, 9 Drawing Sheets

STATE MEASURING APPARATUS AND OPERATION CONTROL METHOD FOR THE SAME

CROSS REFERENCE TO RELATED APPLICATION

This application is based on and incorporates herein by reference Japanese Patent Application No. 2006-81457 filed on Mar. 23, 2006.

FIELD OF THE INVENTION

The present invention relates to a state measuring apparatus and a method of controlling operation thereof. More specifically, the present invention relates to a state measuring apparatus, which measures a state of an object to be inspected based on frequencies of an oscillation-type sensor.

BACKGROUND OF THE INVENTION

A variety of state measuring apparatuses have been used in a wide field of applications for taking measurements by converting physical quantities into electric quantities. In automotive vehicles, in particular, states of various portions are accurately detected by using many sensors, so that control operations are carried out to optimize the operating performance, fuel efficiency and harmony with the environment.

The measuring apparatuses must satisfy the requirements of wide detection ranges and high resolution in addition to the accuracy of measurement. To satisfy such requirements, in the case of a measuring apparatus, the gain of an amplifier is adjusted depending upon the content that is measured, and an offset is adjusted depending upon the gain adjustment.

One conventional measuring apparatus that measures pressure is disclosed in JP 2003-273673A and schematically illustrated in FIG. 1A. In this figure, a sensor chip 1 is a bridge circuit constructed with four resistors including a resistor, which varies its resistance depending upon the pressure being applied and measured. In the bridge circuit, tow resistor rows each having two resistors connected in series are arranged in parallel, and a voltage is applied to the resistor rows. A difference of the voltage is detected across the two connection nodes of the resistors connected in series. When the resistance of one resistor varies depending upon the pressure, the difference in the voltage varies across the two connection nodes of the resistors connected in series, and the variation thereof is output after being amplified by an amplifier 2. To convert the voltage into a digital signal, the output is converted into a digital data through an analog/digital (A/D) converter. It is also allowable to measure a difference in the pressure by so constructing the two resistors of the sensor chip 1 that the resistances thereof vary depending on the pressure on the two portions that measure the difference in the pressure.

The amplifier 2 is capable of varying is gain using a gain control 3, and the gain is adjusted depending upon a pressure value being measured. The amplifier 2 is further capable of varying the zero level of its output by using an offset control 4, and adjusts the zero level at the time of initialization, when the gain is varied and when the temperature is varied. The gain control and the offset control are calibrated at all times by holding the sensor chip 1 under a predetermined condition or by inputting a signal for calibration.

The measuring apparatus may be capable of effecting the calibration at all times, but a sensor incorporated in a device is not capable of effecting the calibration. Further, to effect the gain adjustment or the zero level adjustment, a circuit having a variable resistor must be added. This increases the cost. Therefore, a unit incorporated in the device is constructed with no gain control nor offset control.

A pressure state measuring apparatus for measuring pressure may be constructed as shown in FIG. 1B. The state measuring apparatus has a pressure sensor 5 including the sensor chip 1 shown in FIG. 1A. An amplifier 6 is provided to amplify a voltage difference across the two connection nodes of the sensor chip 1 and outputs it as Vout. The gain and the offset of the amplifier 6 are fixed and not variable. A low-pass filter 7 is provided to remove high-frequency components, which are noise components in the output Vout of the pressure sensor 5, and an A/D converter 8 is provided to convert the output of the filter 7 into a digital data. The digital data are sent to a control unit which executes a variety of controls based on the values detected by the sensor.

Devices that use a temperature sensor or a humidity sensor basically assume the similar construction. The pressure sensor is an electric element which varies the resistance depending upon the physical quantity (pressure) to be measured. Depending upon the cases, however, there will be used an electrostatic capacity or an electronic element that varies the inductance.

The resolution of the construction illustrated in FIG. 1B is determined by a value obtained by dividing a dynamic (measuring) range of the amplifier 6 by the number of discrimination levels specified by the number of bits of the A/D converter 8. When the noise level of the measuring system is greater than the resolution, the resolution is specified by the noise level. To obtain a wide dynamic range while decreasing the resolution, it is considered to increase the number of bits of the A/D converter. However, the cost of the A/D converter sharply increases with an increase in the number of bits thereby increasing cost.

It has further been attempted to provide an oscillation circuit with an electric element which varies the electric characteristics depending upon the physical quantity to be measured, so that the oscillation frequency (period) of oscillation signals varies depending upon a change in the physical quantity to thereby measure the physical quantity by detecting the oscillation frequency. The oscillation frequency can be detected by, for example, counting the number of pulses of oscillation signals in a predetermined period. Further, the length of the oscillation period of oscillation signals can be detected by counting the pulses in a predetermined period. The effect of noise can be decreased by converting the physical quantity into a change in the oscillation frequency instead of converting it into an analog intensity signal. Here, the sensor, which varies the frequency (period) of oscillation signals in response to a change in the physical quantity, is called an oscillation-type sensor.

JP 9-147283A discloses a long-distance transmission system for executing signal transmission over a distance by converting a physical quantity into a frequency (period) of oscillation signals by using an oscillation-type sensor, which varies an electric resistance or an electrostatic capacitance depending on an amount of water content, temperature or pressure and a CR oscillation circuit, which varies the oscillation frequency depending upon an electric resistance or an electrostatic capacity of the sensor. Further, JP 9-43078A discloses a construction that converts a capacity of an electrostatic capacity-type sensor into an oscillation frequency. Further, IP 2000-55954A discloses a construction that converts a resistance into an oscillation frequency.

In the conventional state measuring apparatuses for detecting the physical quantity by utilizing the above oscillation-type sensors, the range of variation in the oscillation frequency is designed for each of the state measuring apparatuses to meet the range of variation in the physical quantity to be measured, resolution and characteristics of the electric element, and is fabricated in the form of a hardware. Therefore, the dynamic range and resolution are fixed and cannot be, usually, changed.

In a unit, such as an engine control unit for an internal combustion engine, that executes processing by reading outputs from many sensors, therefore, detector circuits are provided for detecting various oscillation frequencies (periods) to meet various oscillation-type sensors. Namely, a number of different detector circuits are required, thus increasing cost and size.

In addition, the state measuring apparatus requires a wide dynamic range and a high resolution. It is therefore difficult to satisfy both of these requirements even by using the detection circuits in the oscillation-type sensors. For example, it is possible to take a measurement over a wide dynamic range maintaining a high resolution if the period for counting the oscillation signals is lengthened. However, an increase in the number of bits of the counter necessarily causes an increase in the size of the counter, in the size of the detector circuit and an increase in the cost.

SUMMARY OF THE INVENTION

The present invention has an object of controlling operation of a state measuring apparatus including an oscillation-type sensor, which makes it possible to take a measurement over a wide detection range maintaining a high resolution based on a simple construction by utilizing an oscillation-type sensor.

The present invention has other objects of providing a state measuring apparatus of a simple construction capable of taking a measurement over a wide detection range maintaining a high resolution.

The present invention is based on that, if oscillation signals are synthesized with separate reference oscillation signals having a different frequency, beat signals are generated. The frequency of beat signals is smaller than that of the initial signals. Therefore, the period of the beat signals is longer than that of the initial signals, and the frequency (period) of the beat signals varies depending upon the frequency of the reference oscillation signals, with which the oscillation signals are synthesized.

According to the present invention, therefore, a state measuring apparatus comprises an oscillation-type sensor, a reference oscillation signal generating circuit, a beat signal generating circuit a counter and a physical quantity calculation circuit. The oscillation-type sensor produces sensor oscillation signals at a frequency variable with a state of an object to be inspected. The reference oscillation signal generating circuit generates reference oscillation signals the frequency of which is variable. The beat signal generating circuit generates beat signals by synthesizing the sensor oscillation signals and the reference oscillation signals together. The beat signals have a beat frequency corresponding to a difference in frequencies between the sensor oscillation signals and the reference oscillation signals. The counter measures a period of the beat signals by counting count pulse signals in the period of the beat signals. The physical quantity calculation circuit calculates the frequency of the sensor oscillation signals from a measured period of the beat signals and from a period of the reference oscillation signals, and calculates a state value of the object to be inspected based on the varied period of the reference oscillation signals.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 2:
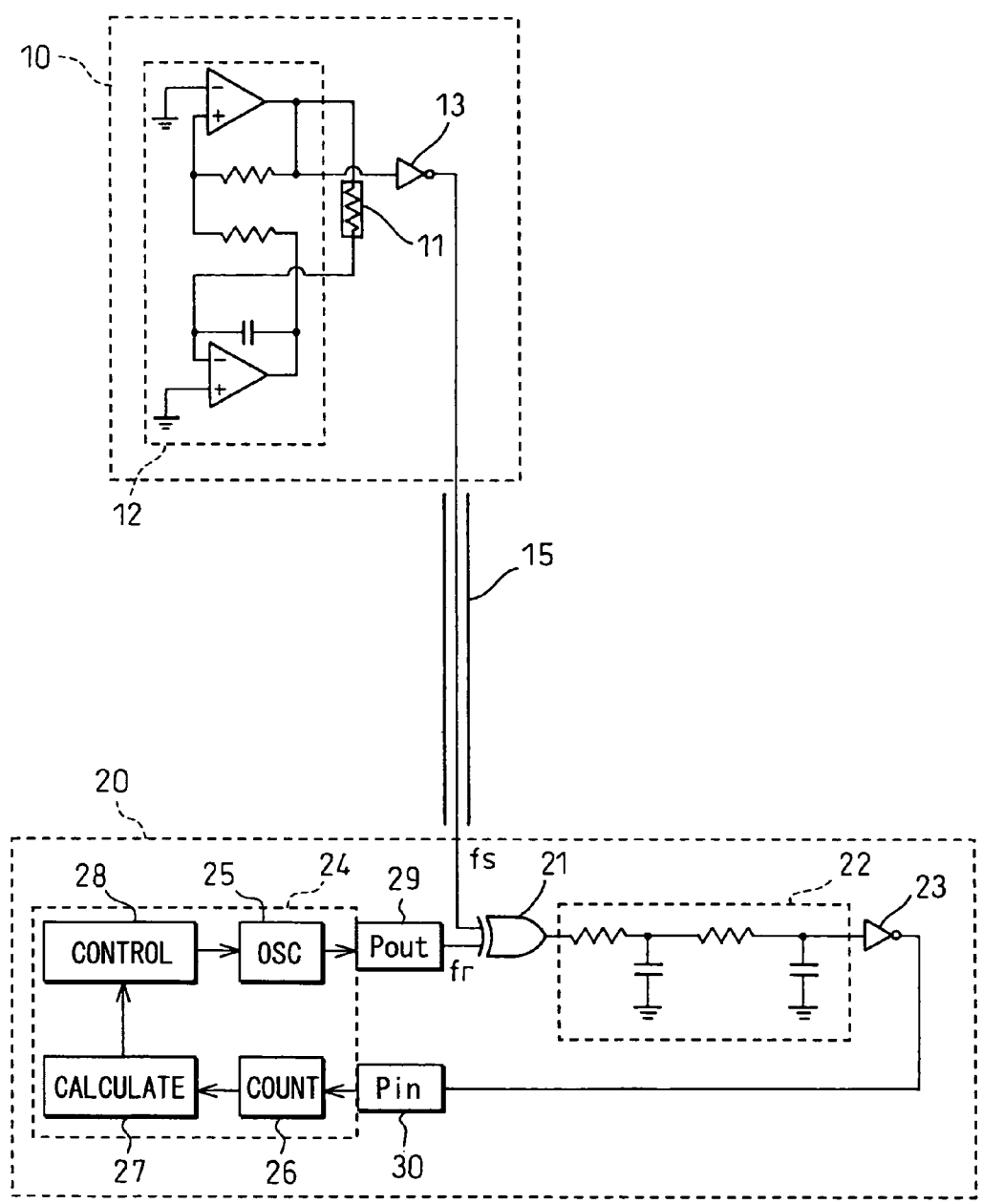
FIG. 2 is a circuit diagram illustrating a state measuring apparatus according to a first embodiment of the present invention.

Referring to FIG. 2, a state measuring apparatus according to a first embodiment includes a sensor 10, a signal transmission line 15 and a detector circuit 20.

The sensor 10 includes a resistor 11 which varies its resistance depending upon a state of an object to be inspected, an oscillation circuit 12 combined with the resistor 11, and an output inverter 13 for transmitting oscillation signals output from the oscillation circuit 12. The sensor 10 is realized as, for example, a semiconductor chip, wherein the resistor 11 is so arranged as to be responsive to the state of the inspection object, that is, inspection object, and the resistance thereof varies depending upon a change in the state of the inspection object. Specifically, the sensor 10 is a pressure sensor, and a semiconductor substrate forming the resistor 11 is so arranged as to receive the pressure from the inspection object. The oscillation circuit 12 oscillates at a frequency fs exclusively determined by the resistance of the resistor 11, that is, pressure applied thereto.

It is also allowable to use a capacitor element which varies its capacitance depending upon the state of the inspection object or an inductance element which varies its inductance instead of using the resistor 11. The oscillation circuit 12 is only an example, and various other circuit constructions may be employed, such as an oscillation circuit constructed with CMOS.

The sensor 10 is connected to the transmission line 15, which transmits the oscillation signals output from the sensor 10 to the detection circuit 20 and may be in any form provided it is capable of transmitting components of the frequency fs to a certain degree. Components of frequencies higher than the frequency fs may be lost in the transmission line 15.

The detector circuit 20 includes a logical exclusive-OR operation circuit (XOR) 21 for synthesizing oscillation signals of the frequency fs transmitted through the transmission line 15 with reference oscillation signals of a frequency fr, a low-pass filter 22 constructed with resistors and capacitors, an inverter 23 and a computer (CPU) 24. The computer 24 has a program installed therein to constitute a reference oscillation signal generating unit 25 for forming reference oscillation signals, a counter 26 for counting the length of a period of a beat signal output from the inverter 23 based on clock signals of the computer 24, a physical quantity calculation circuit 27 for conversion into a physical quantity detected by the sensor 10 based on a value counted by the counter 26, and a measurement controller 28 which controls various portions based on the detected physical quantity and controls the frequency fr of reference oscillation signals formed by the reference oscillation signal generating unit 25. The computer 24 further has a pulse output port (Pout) 29 for producing reference oscillation signals and a pulse input port (Pin) 30 for inputting beat signals produced from the inverter 23.

The logical operation circuit 21, low-pass filter 22 and inverter 23 constitute a beat signal generating circuit that forms beat signals by synthesizing oscillation signals of the frequency fs with the reference oscillation signals of the frequency fr. The reference oscillation signal generating unit 25 has a counter for dividing the frequency by counting clock signals of the computer 24, and forms reference oscillation signals of different frequencies (periods) by varying the frequency-division ratio by changing the counted value according to an instruction from the measurement controller 28. The reference oscillation signal generating unit 25 and the counter 26 can be constructed with using separate circuits instead of a computer. Therefore, separate circuits may be used instead of the computer 24.

Figure 3:
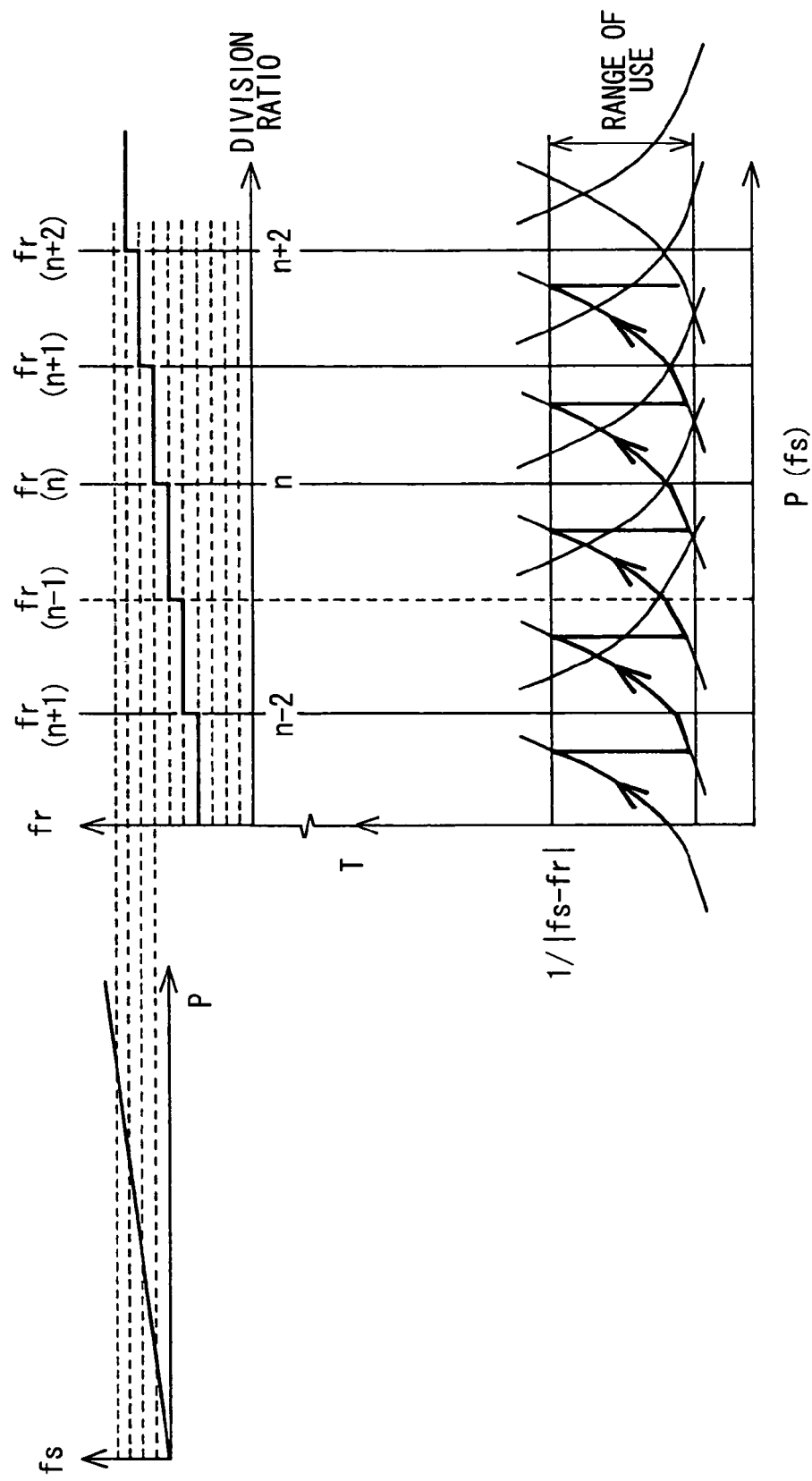
FIG. 3 is a signal diagram illustrating a relationship between a physical quantity measured by the state measuring apparatus and a period of beat signals in the first embodiment.

The principle of operation of the state measuring apparatus of the first embodiment is shown in FIG. 3. The oscillation frequency fs of the sensor 10 varies depending upon the physical quantity of the object, e.g., pressure R Here, the oscillation frequency fs linearly varies depending upon the physical quantity. Not only being limited thereto, however, the oscillation frequency fs may be exclusively determined depending upon the physical quantity in a range of measurement. The physical quantity calculation unit 27 stores a relationship between the physical quantity and the frequency fs measured in advance. Upon varying the frequency-division ratio like (n−2), (n−1), n, (n+1), (n+2), the frequency fr of the reference oscillation signals varies like fr(n−2), fr(n−1), frn, fr(n+1), fr(n+2) which are close to the oscillation frequency fs. The period T of a beat signal is an inverse number of an absolute value of a difference |fs−fr| between the frequency fs of oscillation signals and the frequency fr of reference oscillation signals. If the frequency of the reference oscillation signals is varied like fr(n−2), fr(n−1), frn, fr(n+1), fr(n+2), the period T of the beat signals varies depending upon the physical quantity P as shown, i.e., varies into infinity according to the frequency of the reference oscillation signals fr as represented by a hyperbolic function.

The period of beat signals is determined for its range of use depending upon the resolution and the response of measurement. The resolution is a value approximated to a value obtained by dividing a range of changes in the physical quantity corresponding to a range of use of periods of beat signals by the number of clock signals (count pulse signals) included in the range of use of periods of beat signals (value obtained by dividing the period of beat signals by the period of clock signals). The lower limit of period of beat signals is determined by the required resolution. The resolution increases with an increase in the period of beat signals. However, an upper limit of time required for a measurement has been determined, and the upper limit of period of beat signals is determined thereby.

In a range where the physical quantity is the smallest as represented by thick lines in the lower diagram of FIG. 3, the oscillation frequency is set to be fr(n−2) so that the period of beat signals increases relative to the variation in the physical quantity. In a next range of physical quantities larger than the upper-limit physical quantity in the range of using periods of beat signals of when the oscillation frequency is fr(n−2), the oscillation frequency is set to be fr(n−1) so that the periods of beat signals lie in the range of use. Similarly, the oscillation frequency is set to be frn, fr(n+1), fr(n+2), so that the period of beat signals shifts in a range of physical quantities in a range where the periods of beat signals can be used. Thus, the oscillation frequency fr is varied to generate beat signals of which periods lie in a range of use for the whole range of detecting the physical quantities.

Figure 4:
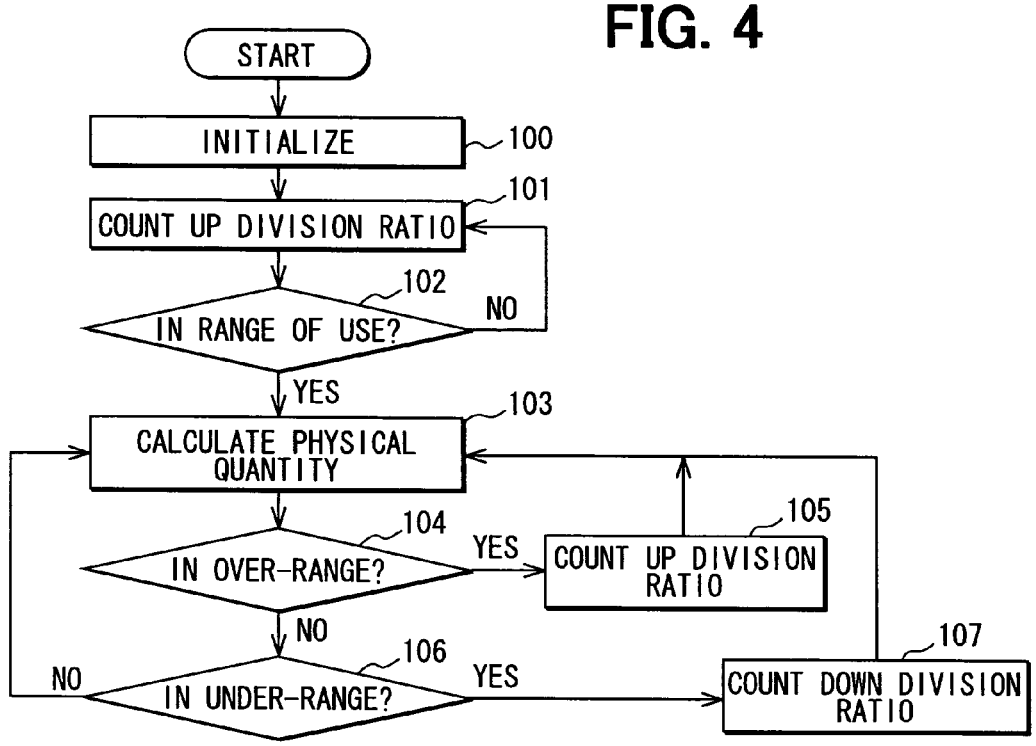
FIG. 4 is a flowchart illustrating processing for setting reference signals in the state measuring apparatus of the first embodiment.

The frequency of reference oscillation signals, i.e., the frequency-division ratio in the counter of the reference oscillation signal generating unit 25 is set in the state measuring apparatus as shown in FIG. 4.

At step 100, the initialization is effected to set the frequency-division ratio in the reference oscillation signal formation to an initial value. At step 101, the frequency-division ratio is increased (counted up) by 1 and at step 102, it is checked whether the period T of beat signals is in a range of use. Steps 101 and 102 are repeated until the period lies in the range of use. After the period has come to lie in the range of use, the routine proceeds to step 103.

At step 103, the physical quantity calculation unit 27 calculates a physical quantity corresponding to a period of beat signals of at that moment from a relationship between the physical quantity and the period of beat signals based on a relationship between the physical quantity and the oscillation frequency fs and on a relationship between fs and fr. At step 104, it is checked whether the calculated physical quantity is in an over-range (exceeding the upper limit of the range). If the calculated physical quantity is over the range, the frequency-division ratio is counted up at step 105, and the routine returns step 103. If it is not exceeding the range, it is, then, checked at step 106 whether the calculated physical quantity is in an under-range (lower than the lower limit of the range). If it is under the range, the frequency-division ratio is counted down at step 107 and the routine returns to step 103. If it is not under the range, the routine returns to step 103.

As described above, the frequency fr of the reference oscillation signals is suitably set depending upon the oscillation frequency fs that varies depending upon the physical quantity, the period T of beat signals is put in the range of use, and the physical quantity is measured maintaining a desired resolution.

The state measuring apparatus of the first embodiment can be modified in a variety of ways.

Figure 5:
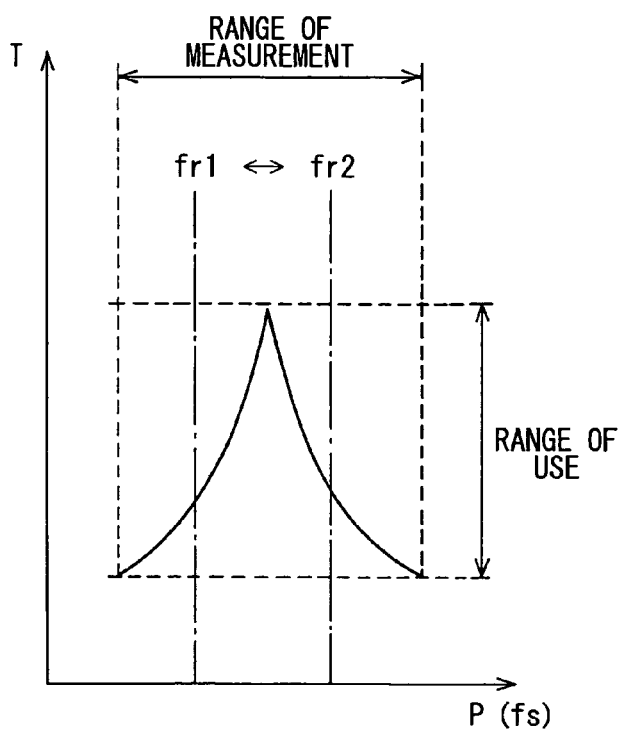
FIG. 5 is a characteristic diagram illustrating a method of setting frequencies of other reference oscillation signals in the state measuring apparatus of the first embodiment.

In the above first embodiment, for example, the frequency fr of the reference oscillation signals is set to be greater than the oscillation frequency fs at all times as shown in FIG. 3. As shown in FIG. 5, however, the frequency fr of the reference oscillation signals may be set to be a frequency fr2 which is greater than the oscillation frequency fs in a range where the physical quantity is small, i.e., in a range where the oscillation frequency fs is small, and the frequency fr of the reference oscillation signals may be set to be a frequency fr1 which is smaller than the oscillation frequency fs in a range where the physical quantity is large, i.e., in a range where the oscillation frequency fs is large. In this case, a relationship between the range of using the periods of beat signals and the range of measuring the physical quantities becomes as shown.

In the above first embodiment, further, the range of using the periods of beat signals is constant. However, as described below, the range of using the periods of beat signals can be varied depending upon the range of measuring the physical quantities.

Second Embodiment

Figure 6:
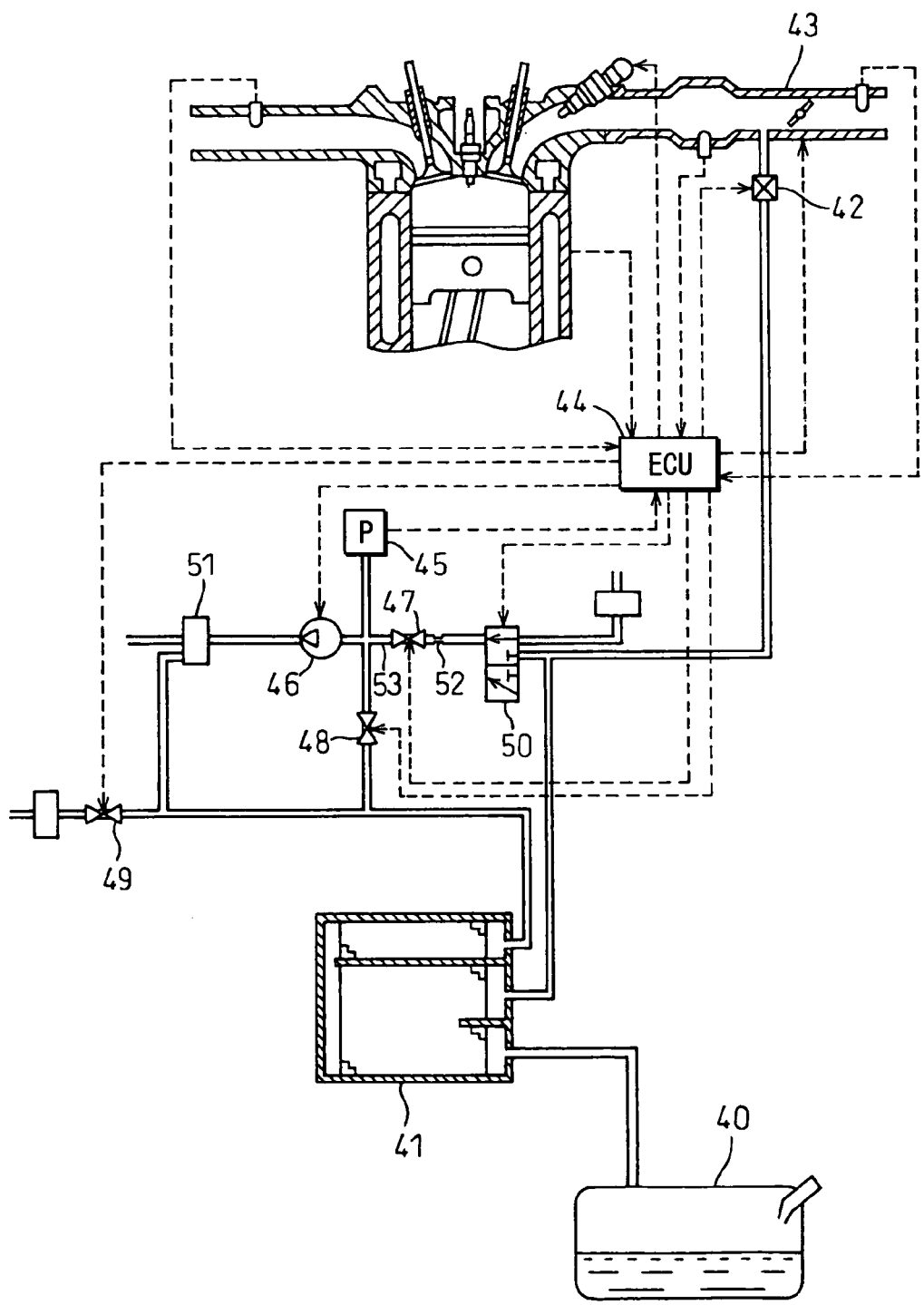
FIG. 6 is a schematic view illustrating an engine system that uses a state measuring apparatus according to a second embodiment of the invention.
Figure 8:
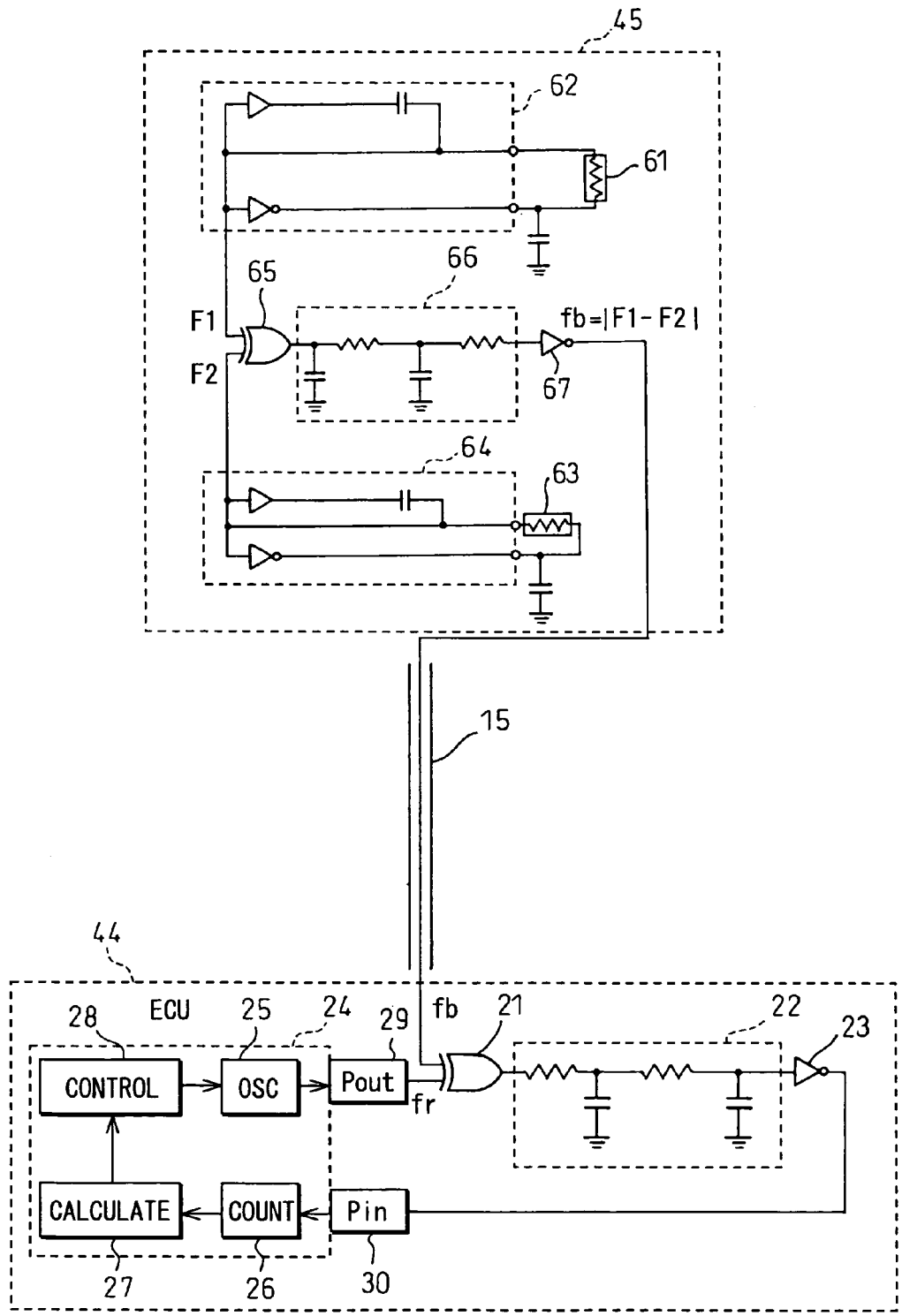
FIG. 8 is a circuit diagram illustrating the state measuring apparatus of the second embodiment.

In a second embodiment, a state measuring apparatus is constructed differently from the first embodiment as shown in FIG. 8 and used in a control system for an internal combustion engine of an automotive vehicle as shown in FIG. 6.

The control system shown in FIG. 6 is constructed as a vaporized fuel control device. In this system, fuel vaporized in a fuel tank 40 is adsorbed by adsorbing material such as activated carbon in a canister 41. The vaporized fuel adsorbed by the adsorbing material in the canister 41 is purged into an intake pipe 43 from the canister 41 when a purge valve 42 is opened due to a negative pressure in the intake pipe 43.

In the vaporized fuel control device, it is necessary to inspect and make sure whether the vaporized fuel is leaking to the exterior and to detect the concentration of a mixture of vaporized fuel to control the vaporized fuel at the time of purging the vaporized fuel into the intake pipe 43 from the canister 41. In controlling the engine, further, it is also necessary to measure the atmospheric pressure. Here, however, the number of sensors can be decreased if the atmospheric pressure can be measured by using a pressure sensor which is used in the vaporized fuel control device without separately providing an atmospheric pressure sensor.

The vaporized fuel control device that effects the above method of measurement, has a measuring passage 53 with a reference orifice 52. An electromagnetic valve 50 is provided at an end of the measuring passage 53, an electromagnetic valve 47 is provided downstream the reference orifice 52 in the measuring passage 53, a pump 46 is provided downstream the electromagnetic valve 47, and an electromagnetic valve 51 similar to the electromagnetic valve 50 is provided downstream the pump 46. Further, a passage having an electromagnetic valve 48 and a passage having an oscillation-type pressure sensor 45 are connected to the measuring passage 53 between the electromagnetic valve 47 and the pump 46. The passage having the electromagnetic valve 48 and one of the outlets of the electromagnetic valve 51 are connected to a passage connecting the canister 41 to an electromagnetic valve 49. In the vaporized fuel control device, an electronic control unit (ECU) 44 actuates the pump 46 and electromagnetic valves 47, 48, 49, 50 and 51, and calculates the pressure by reading the output of the oscillation-type pressure sensor 45.

Figure 7:
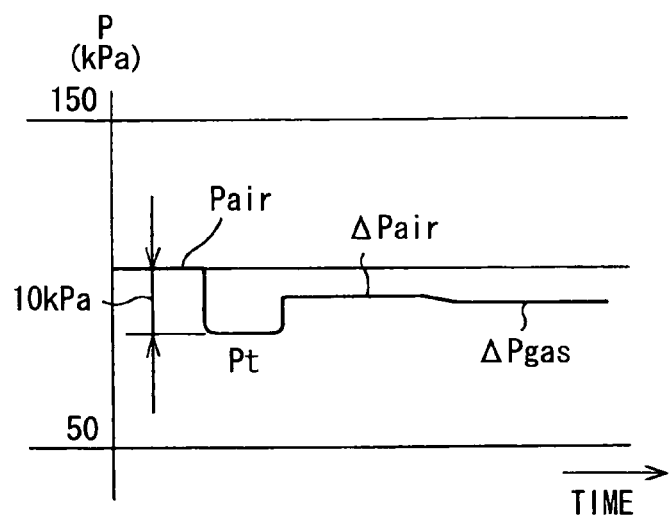
FIG. 7 is a timing diagram illustrating a variation in a pressure detected by the state measuring apparatus of the second embodiment.

Measuring the atmospheric pressure and measuring the concentration of vaporized fuel in the vaporized fuel control device will now be described with reference to FIG. 7. First, the ECU 44 de-energizes the pump 46, opens the electromagnetic valve 47, closes the electromagnetic valves 48 and 49, communicates the electromagnetic valve 50 with the atmosphere and communicates the electromagnetic valve 51 with the atmosphere as shown in FIG. 6. Therefore, the interior of the measuring passage 53 assumes the same pressure state as the atmospheric pressure Pair, and the pressure sensor 45 is placed in a state of measuring the atmospheric pressure (state of measuring the atmospheric pressure).

Next, the electromagnetic valve 47 is closed and the pump 46 is energized; i.e., the interior of the measuring passage 53 assumes a state of negative pressure in which the pressure is decreased to Pt. Next, when the electromagnetic valve 47 is opened, the air passes through the reference orifice 52, and the interior of the measuring passage 53 assumes a state (first concentration measuring state) where the pressure is lower than the atmospheric pressure Pair. The pressure at this moment is denoted by ΔPair. Next, the electromagnetic valves 50 and 51 are communicated with the canister 41, and the mixture containing the vaporized fuel in the canister 41 is allowed to pass through the reference orifice 52 and the measuring passage 53 (second concentration measuring state). The pressure at this moment is denoted by ΔPgas. The mixture contains the vaporized fuel and, therefore, ΔPgas is lower than ΔPair.

From the pressures ΔPair, Pt and ΔPgas measured as described above, the vaporized fuel concentration D (%) is calculated in accordance with the following formula, $$D = \frac{\rho air}{\rho air - \rho gas}\left\{1 - \frac{\Delta Pgas}{\Delta Pair}\frac{(\Delta Pair - Pt)^2}{(\Delta Pgas - Pt)^2}\right\}$$

where ρair and ρgas are densities of the air and gas.

The density ρair is calculated from the measured atmospheric pressure Pair.

The atmospheric pressure Pair is usually about 101 kPa. However, it is necessary to take a measurement of the atmospheric pressure over a range of 50 to 150 kPa by taking into consideration the differences in the environmental conditions in which it is used. Further, the ordinary atmospheric pressures Pair, ΔPair, Pt, ΔPgas are within a range of 10 kPa as shown in FIG. 7. The amount of vaporized fuel purged into the intake pipe 43 from the canister 41 is controlled based on the thus calculated vaporized fuel concentration D.

To inspect the leakage of vaporized fuel to the exterior, the electromagnetic valves 47, 48 and 49 are closed, the pump 46 is operated in a state where the electromagnetic valves 50 and 51 are communicated with the atmosphere to establish a state of negative pressure, and the electromagnetic valve 48 is opened to measure a change in the pressure of when the air is exhausted from all passages communicated with the canister 41. The range of pressure to be measured by the oscillation-type pressure sensor 45 in this inspection is from the atmospheric pressure up to a negative pressure of −10 kPa or, in other words, the same range of pressure as that of when measuring the concentration of the vaporized fuel.

Figure 1A:
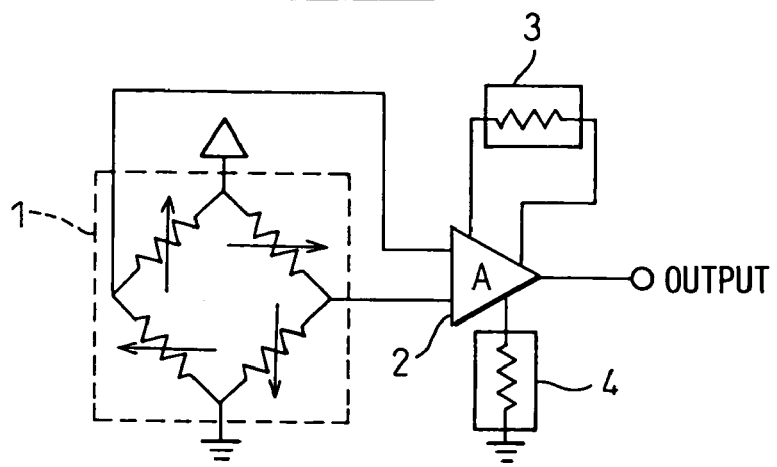
FIGS. 1A and 1B are circuit diagrams illustrating a conventional state measuring apparatus.
Figure 1B:
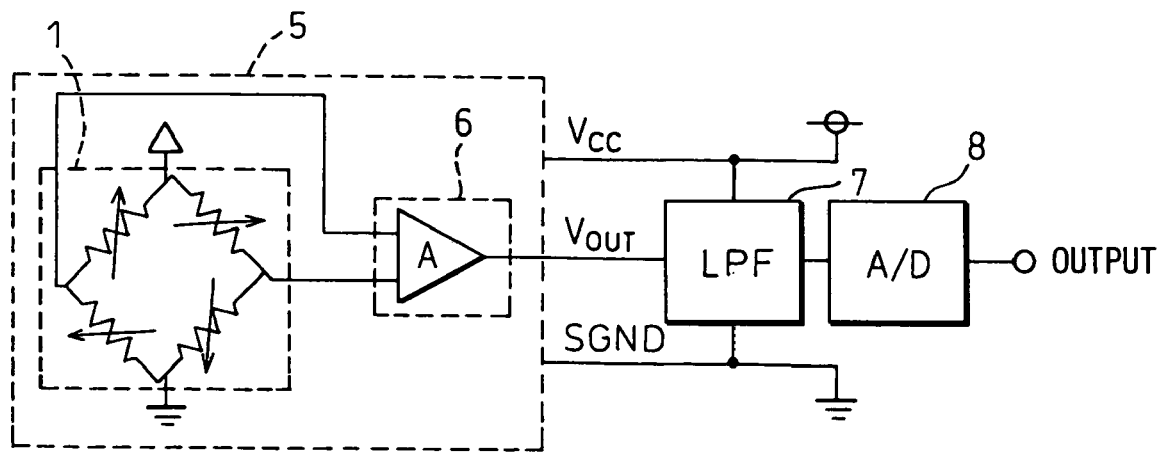

To measure the atmospheric pressure and the concentration of vaporized fuel and to inspect the leakage in the vaporized fuel control device as described above, the oscillation-type pressure sensor 45 must be capable of measuring the pressure over a range of 50 kPa to 150 kPa and, particularly, maintaining a high resolution of about 10 Pa over a range of 10 kPa near 100 kPa. If a condition of A/D conversion that satisfies the above requirement is considered using the conventional conversion into digital signals using the A/D converter shown in FIG. 1B, the range of 100 kPa must be decomposed into $2 \times 10^4$ levels by being divided by 5 Pa, and it becomes necessary to use an A/D converter of 16 bits. Such an A/D converter, however, is very expensive and greatly adds the cost.

For this reason, the pressure sensor 45 is constructed as shown in FIG. 8, in which the ECU 44 is shown as having the similar construction as the detection circuit 20 (FIG. 2) for simplicity. The pressure sensor 45 includes a resistor 61 of which the resistance varies depending upon the pressure in the measuring passage 53, a first oscillation circuit 62 combined with the resistor 61, a reference resistor 63 provided near the resistor 61 and assumes the same temperature as that of the resistor 61 but is so arranged as will not be affected by the pressure, a second oscillation circuit 64 combined with the resistor 63 and is constituted in the same manner as the first oscillation circuit, a logical exclusive-OR operation circuit (XOR) 65 for synthesizing a first oscillation signal (frequency F1) output by the first oscillation circuit 62 and a second oscillation signal (frequency F2) output by the second oscillation circuit 64 together, a low-pass filter 66 constructed with resistors and capacitors, and an inverter 67. The logical operation circuit 65, low-pass filter 66 and inverter 67 form a sensor beat signal generating circuit that forms beat signals by synthesizing oscillation signals of the frequency F1 and reference oscillation signals of the frequency F2.

The first oscillation circuit 62 varies its oscillation frequency depending upon the pressure in the measuring passage 53 and varies its oscillation frequency depending also upon the temperature. The second oscillation circuit 64 varies its oscillation frequency depending upon a change in the temperature like the first oscillation circuit 62. The sensor beat signal generating circuit synthesizes the first oscillation signals of the frequency F1 and the second oscillation signals of the frequency F2 together to form sensor beat signals of the frequency fb which is an absolute value of a difference between F1 and F2. As described above, the first oscillation signals and the second oscillation signals vary their oscillation frequencies in the same manner depending upon a change in the temperature. In the sensor beat signals, therefore, a change in the oscillation frequency caused by a change in the temperature is offset, and the frequency fb varies depending only upon the pressure in the measuring passage 53.

The sensor beat signals output from the inverter 67 are transmitted to the ECU 44 through the transmission line 15 and are processed in the similar manner as in the first embodiment. The beat signals are formed in a doubled way like forming the sensor beat signals by the pressure sensor 45 and, further, forming beat signals by the ECU 44 to calculate a period. Here, the sensor beat signals themselves are oscillation signals, and there is no particular problem. The upper-limit cut frequency of the low-pass filter 22 is set to be lower than that of the low-pass filter 66.

A relationship between the pressure and the resistance of the resistor 61, a relationship between the resistance of the resistor 61 and the frequency of the first oscillation signals, a relationship between the frequency of the first oscillation signals and the frequency (period) of the sensor beat signals obtained by synthesizing the first oscillation signals and the second oscillation signals together, and a relationship between the frequency (period) of the sensor beat signals and the frequency (period) of the beat signals, may be predetermined, and are stored in the physical quantity calculation unit 27. The physical quantity calculation unit 27 calculates the pressure from the calculated period of beat signals.

In the second embodiment, the reference oscillation signal generating unit 25 sets the frequency of reference oscillation signals so that the pressure in the measuring passage can be measured maintaining a required resolution in a state of measuring the atmospheric pressure, in a state of measuring the negative pressure, in a state of measuring the first concentration and in a state of measuring the second concentration in the same manner as in the first embodiment described with reference to FIGS. 3 to 5.

Figure 9:
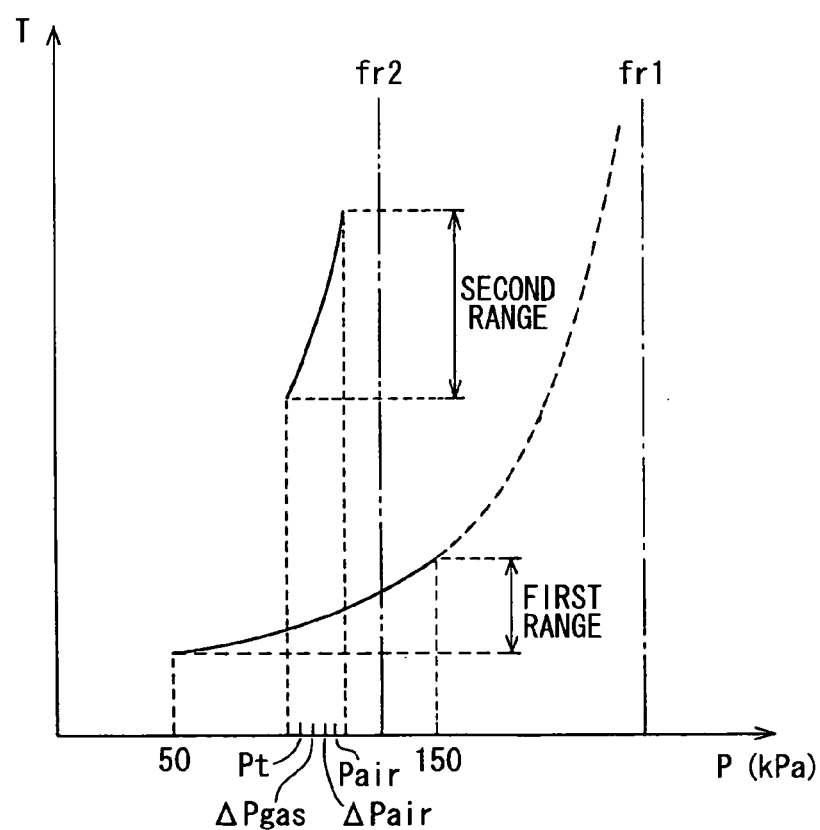
FIG. 9 is a characteristic diagram illustrating a modified example of the method of setting the frequency of reference oscillation signals in the state measuring apparatus of the second embodiment.

As described above, the negative pressure Pt, the pressure ΔPair in the state of measuring the first concentration and the pressure ΔPgas in the state of measuring the first concentration are within 10 kPa with respect to the atmospheric pressure Pair. As illustrated in FIG. 9, therefore, when the atmospheric pressure Pair is to be measured, first, the reference oscillation signal generating unit 25 sets the frequency of the reference oscillation signals to be fr1 so that the period of the beat signals lie in a relatively narrow first range relative to the pressure range of 50 kPa to 150 kPa, to thereby measure the period T of the beat signals. Thus, the atmospheric pressure Pair is measured though the precision is not so high. Next, based on the measured atmospheric pressure, the frequency of the reference oscillation signals is set to be fr2 so that the periods of beat signals lie in a wide second range (wider than the first range) relative to Pair, Pt, ΔPair and ΔPgas which are within 10 kPa to thereby measure the period of the beat signals. Pair, Pt, ΔPair and ΔPgas are measured maintaining a high resolution from the measured results.

Figure 10:
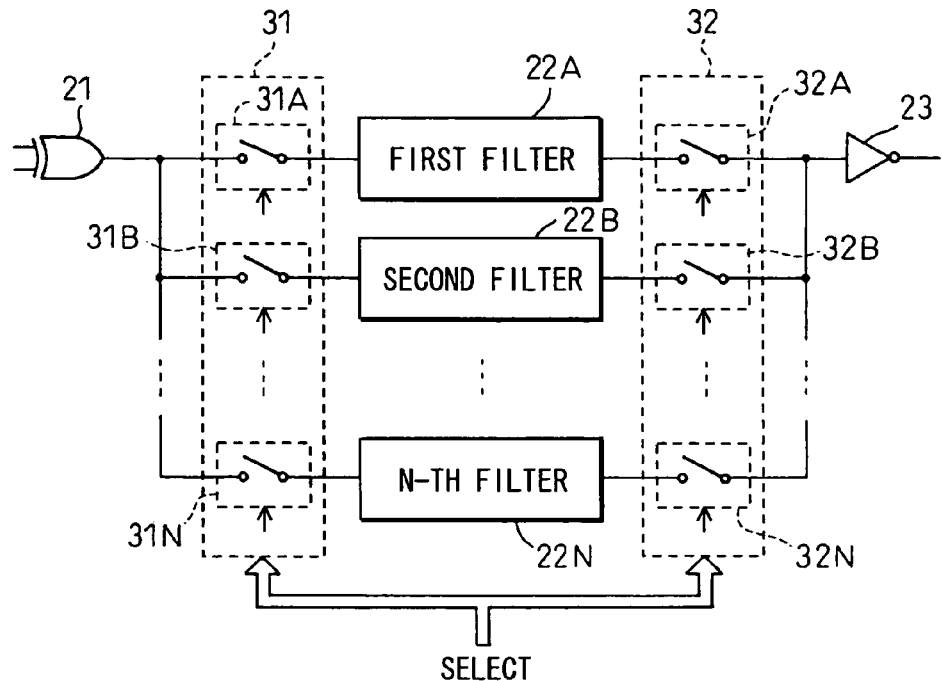
FIG. 10 is a circuit diagram illustrating a modified example of a low-pass filter in the state measuring apparatus of the second embodiment.

When the frequencies (periods) of beat signals lie in different ranges as shown in FIG. 9, the synthesized signals may not often be shaped to a sufficient degree by the low-pass filter 22. As shown in FIG. 10, therefore, there are provided a plurality of low-pass filters (two filters when there are two kinds of beat signals) 22A to 22N having different upper-limit frequencies, a selector 31 constructed with a plurality of switches 31A to 31N to feed the output of the XOR gate 21 to any one of the plurality of low-pass filters 22A to 22N, and a selector 32 constructed with a plurality of switches 32A to 32N to select the output of any one of the plurality of low-pass filters 22A to 22N and to feed it to the inverter 23, so that a suitable low-pass filter can be selected depending upon the frequency (period) of the beat signals.

Third Embodiment

Figure 11:
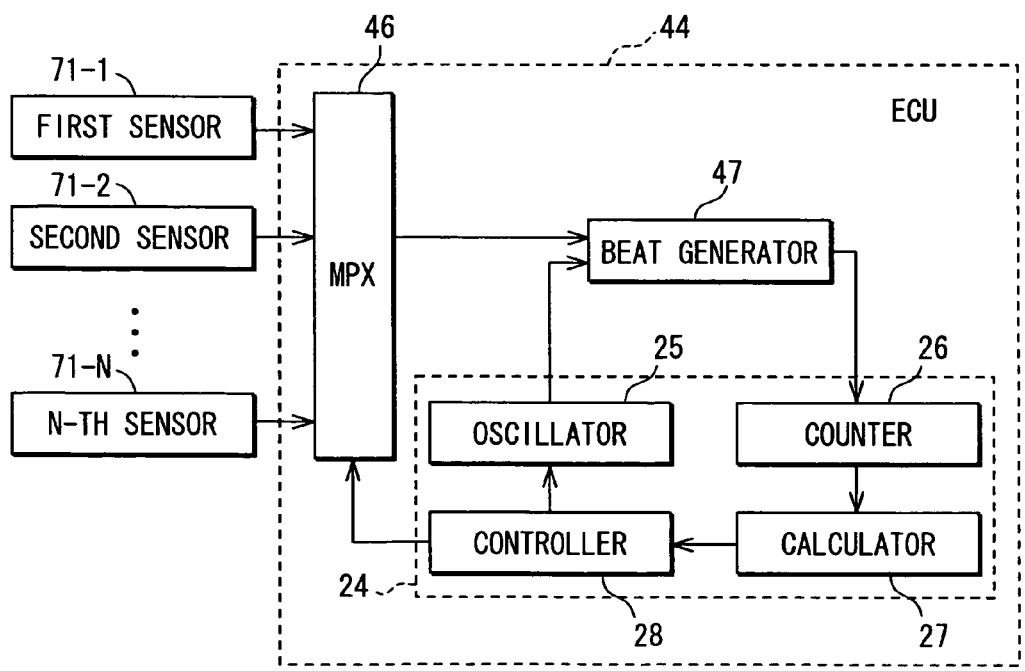
FIG. 11 is a circuit diagram illustrating a state measuring apparatus according to a third embodiment of the invention.

In a third embodiment, a state measuring apparatus is constructed as shown in FIG. 11. The ECU 44 has a construction similar to the ECU of the second embodiment but is different with respect to the provision of a multiplexer 46. A beat signal generator 47 may be constructed with the exclusive-OR circuit 21, the low-pass filter 22 and the inverter 23 as in the first and the second embodiment. The ECU 44 receives oscillation signals from a plurality of oscillation-type sensors 71-1, 71-2, - - - , 71-N, one or all of which may be a pressure sensor of the first embodiment. The measurement controller 28 so controls the multiplexer 46 as to select the sensor oscillation signals output from a sensor which is the object to be measured, and so controls the reference oscillation signal generating circuit 25 as to form reference oscillation signals adapted to detecting a change in the frequency of the selected sensor oscillation signals. In other respects, the ECU 44 of the third embodiment is the same as those of the first and second embodiments.

Figure 12:
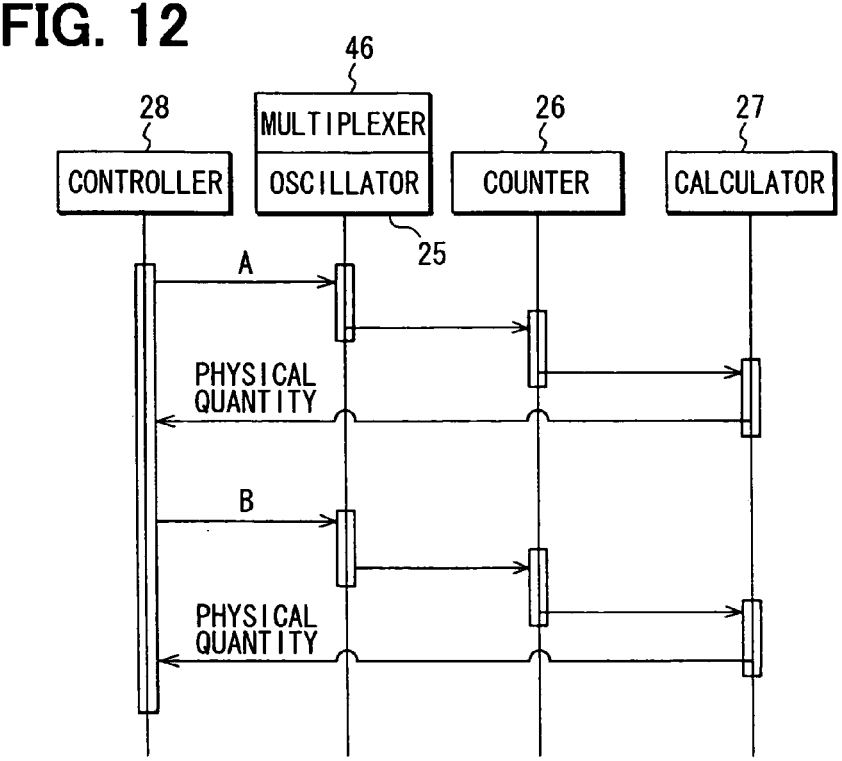
FIG. 12 is a timing diagram illustrating an operation of the state measuring apparatus of the third embodiment.

The ECU 44 controls physical quantity measuring operation as shown in FIG. 12. To execute the sequence of measurement A, the controller 28 so controls the multiplexer 46 as to select the output of the sensor used for the measurement A, and instructs the reference oscillation signal generating unit 25 to form predetermined reference oscillation signals. Therefore, there are formed beat signals of the sensor oscillation signals output by the selected sensor and the reference oscillation signals. The counter 26 measures the period of oscillation signals, the physical quantity calculation unit 27 calculates the physical quantity based on the period thereof, and the physical quantity is sent to the measurement controller 28. The sequence of measurement B, too, is conducted in the same manner.

In the sequence of FIG. 12, the processing for differing the dynamic range and the resolution can be conducted as an independent sequence by differing the period of beat signals for the physical quantity by synthesizing different reference oscillation signals for the same sensor oscillation signals as described in the second embodiment.

In the ECU of the third embodiment as described above, the physical quantities of various oscillation-type sensors can be measured by a common detector circuit in a dynamic range and resolution adapted to the object being measured.

Fourth Embodiment

Figure 13:
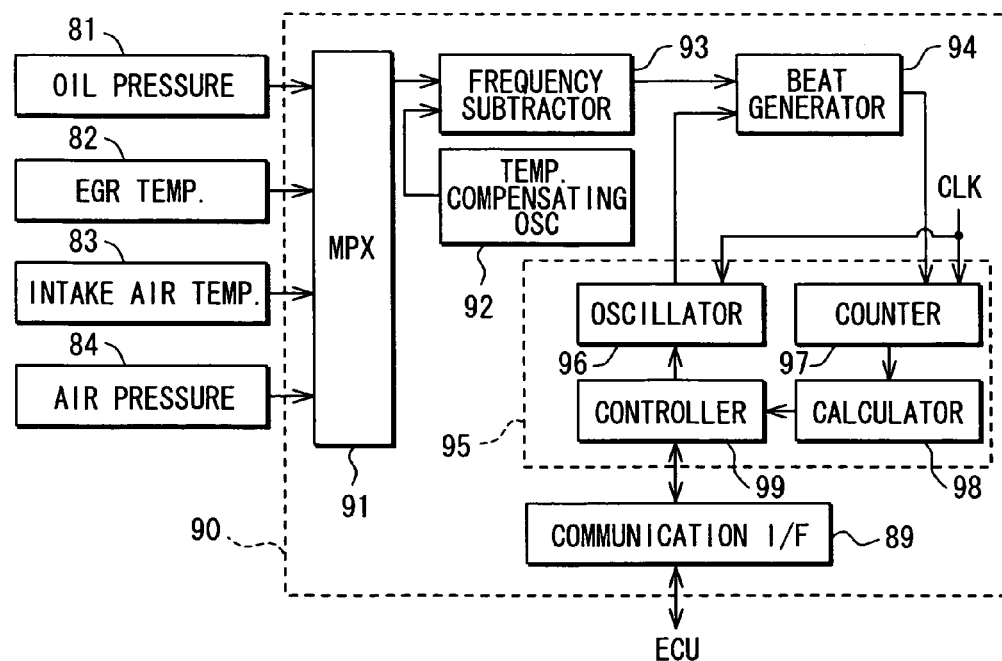
FIG. 13 is a block diagram illustrating a state measuring apparatus according to a fourth embodiment of the invention.

In a fourth embodiment, a state measuring apparatus is constructed to include a sensor module 90 as shown in FIG. 13.

The sensor module 90 processes at one time the sensor oscillation signals output from a plurality of oscillation-type sensors, which may includes an oil pressure sensor 81, an EGR temperature sensor 82, an intake air temperature sensor 83 and a pressure sensors 84 similar to the sensor of the second embodiment. The sensor module 90 transmits the processed data (physical quantity data) to an ECU at a remote position. The processed contents are instructed from the ECU to the sensor module 90, and the physical quantity data are transmitted from the sensor module 90 to the ECU, via a communication circuit.

The sensor module 90 includes a multiplexer 91 which selects any one of sensor oscillation signals output from a plurality of oscillation-type sensors 81 to 84 and outputs them, a temperature-compensating oscillation signal generator circuit 92 for generating oscillation signals for compensating the temperature, a frequency subtractor (differential) unit 93 for forming corrected oscillation signals by removing the effect of a change in the temperature by synthesizing together the selected sensor oscillation signals and the oscillation signals for compensating the temperature, a beat signal generating circuit 94, a computer 95, and a communication interface (I/F) 89. Like those of the first and second embodiments, the computer 95 includes a reference oscillation signal generating unit 96, a counter 97, a physical quantity calculation unit 98, and a measurement controller 99. The temperature-compensating oscillation signal generator circuit 92 can be realized in the same manner as a circuit constructed with the reference resistor 63 and the second oscillation circuit 64 of FIG. 8. When a single temperature-compensating oscillation signal generator circuit 92 is not capable of coping with a plurality of sensors, the temperature-compensating oscillation signal generator circuits 92 may be provided in a plural number to meet the sensors, and the outputs are selected by a separately provided multiplexer and are fed to the frequency differential unit 93. The frequency differential unit 93 can be realized in the same manner as the circuit constructed with XOR gate 65, low-pass filter 66 and inverter 67 of FIG. 8. The beat signal generating circuit 94 can be realized in the similar manner as the circuit constructed with XOR gate 21, low-pass filter 22 and inverter 23 of FIG. 8.

Here, the sensor module 90 processes the pressure sensors only at one time. The sensor module, however, may be so fabricated as to also process the sensor oscillation signals produced by the oscillation-type sensors that measure other physical quantities. In this case, another temperature-compensating oscillation signal generator circuit 92 must be, further, provided to meet the oscillation-type sensor that measures other physical quantities.

What is claimed is:

1. A method of controlling operation of a state measuring apparatus comprising:
    synthesizing sensor oscillation signals having a frequency variable depending upon a state of an object to be inspected and reference oscillation signals together, to form beat signals having a beat frequency corresponding to a difference in frequencies between the sensor oscillation signals and the reference oscillation signals;
    measuring a period of the beat signals by counting count pulse signals in the period of the beat signals; and
    calculating a frequency of the sensor oscillation signals from a measured period of the beat signals and a period of the reference oscillation signals, and calculating a state value of the object from a calculated frequency of the sensor oscillation signals;
    wherein a frequency of the reference oscillation signals is varied, and the frequency of the sensor oscillation signals and the state value of the object are calculated based on the varied period of the reference oscillation signals.

2. The method according to claim 1, wherein the reference oscillation signals are so varied that the period of the beat signals lies within a predetermined range.

3. A state measuring apparatus comprising:
    an oscillation-type sensor for producing sensor oscillation signals at a frequency variable with a state of an object to be inspected;
    a reference oscillation signal generating circuit for generating reference oscillation signals;
    a beat signal generating circuit for generating beat signals by synthesizing the sensor oscillation signals and the reference oscillation signals together, the beat signals having a beat frequency corresponding to a difference in frequencies between the sensor oscillation signals and the reference oscillation signals;

a counter for measuring a period of the beat signals by counting count pulse signals in the period of the beat signals; and a physical quantity calculation circuit for calculating the frequency of the sensor oscillation signals from a measured period of the beat signals and from a period of the reference oscillation signals, and for calculating a state value of the object to be inspected, wherein the reference oscillation signal generating circuit varies the frequency of the reference oscillation signals, and wherein the physical quantity calculation circuit calculates the frequency of the sensor oscillation signals and the state value of the object to be inspected based on the varied period of the reference oscillation signals.

4. The state measuring apparatus according to claim 3, wherein the reference oscillation signal generating circuit varies the reference oscillation signals so that the period of the beat signals lies within a predetermined range.

5. The state measuring apparatus according to claim 3, wherein the reference oscillation signal generating circuit includes a counter which counts clock signals to generate the reference oscillation signals, and varies the period of the reference oscillation signals by varying a count value of the counter.

6. The state measuring apparatus according to claim 3, wherein the reference oscillation signal generating circuit, the counter and the physical quantity calculation circuit are constructed as a programmed computer.

7. The state measuring apparatus according to claim 3, wherein the oscillation-type sensor includes in an oscillation circuit thereof a varying element which varies electric characteristics depending upon the state of the inspection object.

8. The state measuring apparatus according to claim 3, wherein the oscillation-type sensor includes a first oscillation circuit, a second oscillation circuit, and a synthesizing circuit for generating starting beat signals depending upon a difference in frequencies between first oscillation signals produced by the first oscillation circuit and second oscillation signals produced by the second oscillation circuit, and produces the starting beat signals as the oscillation signals.

9. The state measuring apparatus according to claim 3, further comprising:

an electronic control unit, wherein the oscillation-type sensor is provided as a pressure sensor in a measuring passage of an engine system, the engine system being constructed to temporarily adsorb vaporized fuel guided from a fuel tank through an introduction passage in a canister and measure a concentration of mixture released from the canister to guide the mixture into an intake pipe of an internal combustion engine through a purging passage, thereby to measure a leakage of the vaporized fuel into the atmosphere, and the engine system including an orifice in the measuring passage, a gas stream generating means for generating a gas stream in the measuring passage along the measuring passage, a measuring passage change-over means for changing over to any one of a state of measuring the atmospheric pressure by opening the measuring passage to the atmosphere without operating the gas stream generating means, a state of a negative pressure in which the gas stream generating means is operated by closing an end of the measuring passage, a state of measuring a first concentration in which the measuring passage is opened at its both ends to the atmosphere so that the air flows as a gas stream into the measuring passage, and a state of measuring a second concentration in which the measuring passage is communicated at both ends with the canister so that the mixture flows as a gas stream into the measuring passage, wherein the electronic control unit calculates concentration of the mixture by reading an output of the pressure sensor and for determining an occurrence of leakage of the vaporized fuel into the atmosphere, and wherein the reference oscillation signal generating circuit varies the frequency of the reference oscillation signals depending upon the states of measuring.

10. The state measuring apparatus according to claim 9, wherein in the state of measuring the first and second concentrations, the reference oscillation signal generating circuit varies the reference oscillation signals so that the period of the beat signals becomes longer than that in the state of measuring the atmospheric pressure or in the state of the negative pressure.

11. The state measuring apparatus according to claim 9, wherein the reference oscillation signal generating circuit, the beat signal generating circuit, the counter and the physical quantity calculation circuit are provided in the electronic control unit of the engine system.

12. The state measuring apparatus according to claim 9, wherein the pressure sensor includes in an oscillation circuit thereof a varying element of which electric characteristics vary depending upon a pressure.

13. The state measuring apparatus according to claim 12, wherein the varying element is one of a resistor or a capacitor.

14. The state measuring apparatus according to claim 9, wherein the oscillation-type sensor includes a first oscillation circuit, a second oscillation circuit, and a synthesizing circuit for generating starting beat signals depending upon a difference in frequencies between the first oscillation signals produced by the first oscillation circuit and the second oscillation signals produced by the second oscillation circuit, and produces the starting beat signals as the oscillation signals.

15. A state measuring apparatus comprising:

a reference oscillation signal generating circuit for generating reference oscillation signals;

a beat signal generating circuit for generating beat signals by synthesizing the reference oscillation signals and sensor oscillation signals, a frequency of which is variable with a state of an engine system to be inspected, the beat signals having a beat frequency corresponding to a difference in frequencies between the sensor oscillation signals and the reference oscillation signals;

a counter for measuring a period of the beat signals by counting count pulse signals in the period of the beat signals; and a physical quantity calculation circuit for calculating the frequency of the sensor oscillation signals from a measured period of the beat signals and from a period of the reference oscillation signals, and for calculating a state value of the object to be inspected, wherein the reference oscillation signal generating circuit varies the frequency of the reference oscillation signals, and wherein the physical quantity calculation circuit calculates the frequency of the sensor oscillation signals and the state value of the engine system based on the varied period of the reference oscillation signals.

16. The state measuring apparatus according to claim 15, wherein the reference oscillation signal generating circuit varies the frequency of the reference oscillation signals depending upon the state of the engine system.

17. The state measuring apparatus according to claim 15, further comprising:
a multiplexer for selecting one of a plurality of sensors provided in the engine system, each of the sensors producing respective sensor oscillation signals,
wherein the reference oscillation signal generating circuit varies the period of the reference oscillation signals depending upon the sensor oscillation signals of a selected one of a plurality of sensors.

18. A state measuring apparatus comprising:
a multiplexer for selecting sensor oscillation signals out of a plurality of sensor oscillation signals received from a plurality of oscillation-type sensors;
a temperature-compensating oscillation signal generating circuit for generating compensating oscillation signals for compensating the temperature;
a frequency differential circuit for generating temperature-compensated sensor oscillation signals by removing effect of a change in temperature by synthesizing a selected sensor oscillation signals and the compensating oscillation signals;
a reference oscillation signal generating circuit for generating reference oscillation signals;
a beat signal generating circuit for generating beat signals by synthesizing the temperature-compensated sensor oscillation signals and the reference oscillation signals together;
a counter for measuring a period of the beat signals by counting count pulse signals in the period of the beat signals;
a physical quantity calculation circuit for calculating a frequency of the sensor oscillation signals from the measured period of the beat signals and from the period of the reference oscillation signals, and for calculating a state value of an object that corresponds to the selected sensor oscillation signals; and
a communication interface circuit for transmitting a calculated state value to an external control unit.

19. The state measuring apparatus according to claim 18, wherein the plurality of oscillation-type sensors includes at least a pressure sensor for detecting a pressure in an engine system.

20. The state measuring apparatus according to claim 19, wherein the plurality of oscillation-type sensors further includes a temperature sensor for detecting a temperature in the engine system.

* * * * *